US010186016B2

(12) United States Patent
Nagano et al.

(10) Patent No.: US 10,186,016 B2
(45) Date of Patent: Jan. 22, 2019

(54) IMAGE PROCESSING DEVICE, IMAGE DISPLAY DEVICE, IMAGE PROCESSING SYSTEM, AND IMAGE PROCESSING METHOD

(71) Applicant: Panasonic Intellectual Property Management Co., Ltd., Osaka (JP)

(72) Inventors: Keijiroh Nagano, Osaka (JP); Masaharu Matsumoto, Osaka (JP); Yoshifumi Asao, Hyogo (JP); Tetsuhiro Kaya, Hyogo (JP); Masahiko Yamamoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/422,536

(22) Filed: Feb. 2, 2017

(65) Prior Publication Data

US 2018/0047135 A1    Feb. 15, 2018

(30) Foreign Application Priority Data

Aug. 10, 2016    (JP) .................. 2016-157436

(51) Int. Cl.
*G06T 3/40*      (2006.01)
*G06T 3/00*      (2006.01)

(52) U.S. Cl.
CPC .......... *G06T 3/4038* (2013.01); *G06T 3/0012* (2013.01)

(58) Field of Classification Search
CPC ............................ G06T 3/4038; G06T 3/0012
See application file for complete search history.

(56) References Cited

U.S. PATENT DOCUMENTS

| 2012/0113149 A1 | 5/2012 | Tanabe |
| 2013/0229546 A1* | 9/2013 | Furumura ............. G06T 3/4038 348/229.1 |
| 2014/0016861 A1* | 1/2014 | Houjou ................... G06T 11/20 382/162 |
| 2014/0055616 A1* | 2/2014 | Corcoran ................. B60R 1/00 348/148 |

(Continued)

FOREIGN PATENT DOCUMENTS

| JP | 2012-098621 | 5/2012 |
| WO | WO 2014/085948 | * 6/2014 |

*Primary Examiner* — David F Dunphy
(74) *Attorney, Agent, or Firm* — McDermott Will & Emery LLP

(57) ABSTRACT

An image processing device for generating a single image based on a plurality of images captured by a plurality of imaging devices having different pointing directions from each other includes a memory and a controller. The memory is configured to store information containing at least the pointing directions and fields of view of the plurality of imaging devices. The controller is configured to operate as follows: to acquire or generate, from the plurality of images, first image data and second image data whose imaging ranges do not overlap; to apply image processing to the first image data and the second image data in such a manner that the first image data and the second image data have angular ranges larger than the fields of view in at least one direction; and to generate a single piece of multi-directional image data containing the image-processed first image data and second image data.

18 Claims, 12 Drawing Sheets

(56) References Cited

U.S. PATENT DOCUMENTS

| | | | |
|---|---|---|---|
| 2016/0078598 A1* | 3/2016 | Tanabe | G06T 7/11 382/284 |
| 2016/0086306 A1* | 3/2016 | Nishimaki | G06T 3/40 345/620 |
| 2017/0015248 A1* | 1/2017 | Baur | B60R 1/00 |
| 2017/0061703 A1* | 3/2017 | Ryu | G06T 3/4038 |
| 2017/0068840 A1* | 3/2017 | Chaki | G06K 9/6262 |

\* cited by examiner

IMAGE PROCESSING DEVICE, IMAGE DISPLAY DEVICE, IMAGE PROCESSING SYSTEM, AND IMAGE PROCESSING METHOD

TECHNICAL FIELD

The present disclosure relates to an image processing device, an image display device, an image processing system, and an image processing method. In particular, the present disclosure relates to a technique for generating a single image from a plurality of images.

DESCRIPTION OF THE RELATED ART

There is a known technique for combining a plurality of images into a single image and displaying the combined single image. For example, Patent Literature 1 shows a technique for combining a plurality of related images acquired from an information processing device and displaying it as a single image.

CITATION LIST

Patent Literature

Patent Literature 1: Japanese Unexamined Patent Application Publication No. 2012-98621

SUMMARY

An object of the present disclosure is directed to displaying a single image generated from a plurality of images less unnaturally.

According to an aspect of the present disclosure, an image processing device for generating a single image based on a plurality of images captured by a plurality of imaging devices having different pointing directions from each other includes a memory and a controller. The memory is configured to store information containing at least the pointing directions and fields of view of the plurality of imaging devices. The controller is configured to operate as follows: to acquire or generate, from the plurality of images, first image data and second image data whose imaging ranges do not overlap; to apply image processing to the first image data and the second image data in such a manner that the first image data and the second image data have angular ranges larger than the fields of view in at least one direction; and to generate a single piece of multi-directional image data containing the image-processed first image data and second image data.

According to another aspect of the present disclosure, an image display device for displaying a single image generated based on a plurality of images captured by a plurality of imaging devices having different pointing directions from each other includes a controller and a display unit. The controller is configured to acquire multi-directional image data generated based on the plurality of images and to generate image data for display from the multi-directional image data in accordance with an attitude or an operation of the image display device. The multi-directional image data contains at least two pieces of image data whose imaging ranges do not overlap and further contains a predetermined image data area between the two pieces of image data, the predetermined image data area being not contained in either of the two pieces of image data. The display unit configured to display the image data for display, the display unit being able to display the predetermined image data area contained in the image data for display.

According to still another aspect of the present disclosure, an image processing system includes the above-mentioned image processing device and an image display device communicative with the image processing device and including a display unit capable of displaying at least part of the single piece of multi-directional image data.

According to still another aspect of the present disclosure, an image processing method for generating a single image based on a plurality of images captured by a plurality of imaging devices having different pointing directions from each other includes storing information in a memory. The information contains at least the pointing directions and fields of view of the plurality of imaging devices. First image data and second image data whose imaging ranges do not overlap are acquired or generated from a plurality of images. Image processing is applied to the first image data and the second image data in such a manner that the first image data and the second image data have angular ranges larger than the fields of view in at least one direction. A single piece of multi-directional image data containing the image-processed first image data and second image data are generated.

The present disclosure is effective in displaying a single image generated from a plurality of images less unnaturally.

DETAILED DESCRIPTION OF THE PREFERRED EMBODIMENTS

Exemplary embodiments will be described in detail as follows with reference to the accompanying drawings. However, the description of well-known matter and of substantially the same configuration as described earlier may be omitted to avoid redundancy and help those skilled in the art understand them easily.

Note that the attached drawings and the following description are provided to make those skilled in the art fully understand the present disclosure and are not intended to limit the claimed subject matter.

Outline

There is a growing demand for 3D panoramic image-based entertainment. Such 3D panoramic images can be formed by combining images captured with a plurality of cameras facing different directions from each other and then generating a multi-directional image that covers contiguous imaging ranges.

However, in an environment in which the location and number of cameras are limited, there are some areas that fall outside the imaging range of any of the cameras (i.e., there are some areas where no images are present). In such a case, it is impossible to acquire a multi-directional image. In particular, when views from a flying airplane are captured by cameras installed in the airplane and the captured video is delivered to the user, who is a passenger in the airplane, the video often fails to cover a contiguous multi-directional imaging range because the location and number of these cameras are limited in terms of safety.

The present disclosure provides a technique for generating and displaying a natural omnidirectional image regardless of the presence of areas that have not been captured by cameras.

First Exemplary Embodiment

A first exemplary embodiment will now be described as follows. In the following example, the image processing system in accordance with the present exemplary embodiment is used in an airplane.

1-1. Structure 1-1-1 Structure of the System

Figure 1:
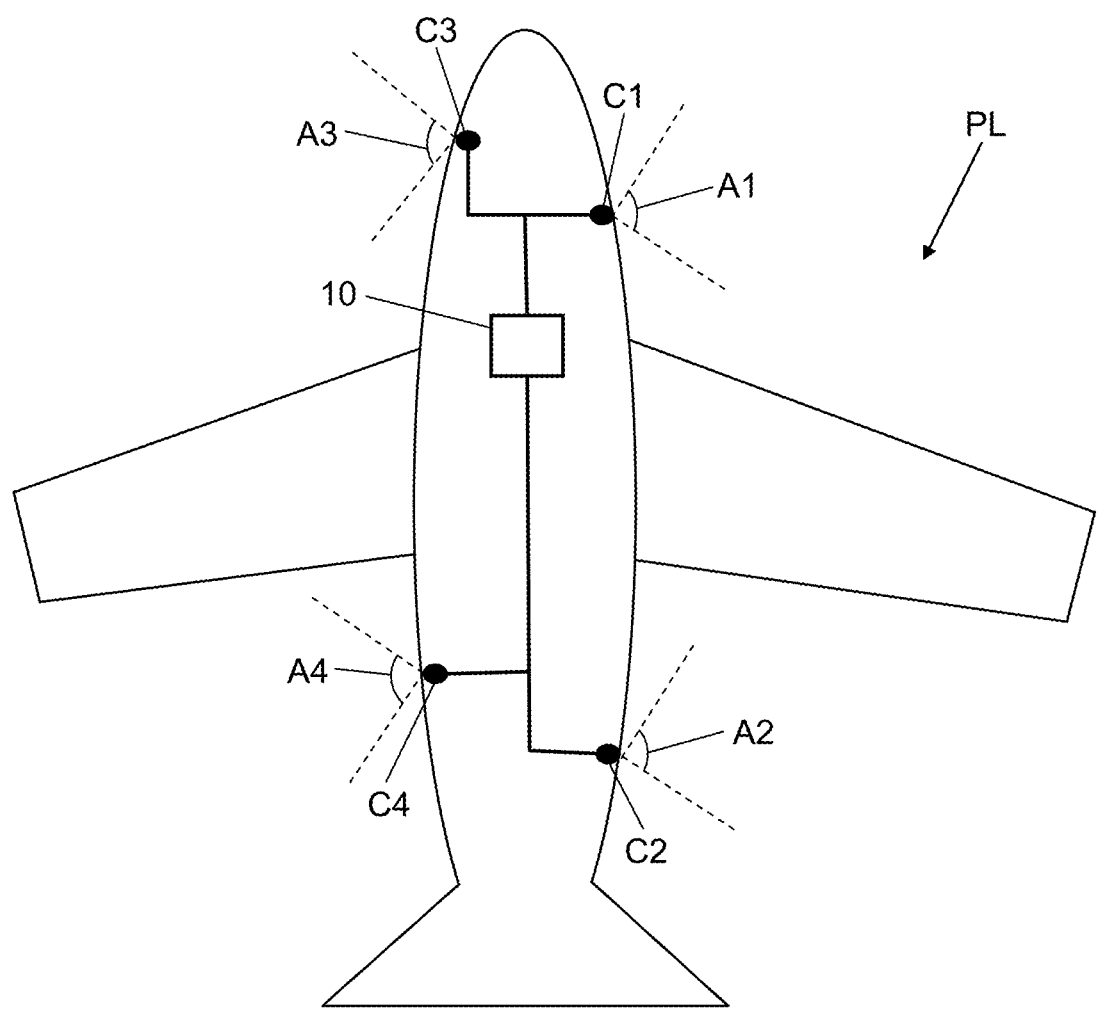
FIG. 1 shows the locations of cameras in the first exemplary embodiment.

FIG. 1 shows the locations of cameras in the present exemplary embodiment. As shown in FIG. 1, an airplane PL is equipped with cameras C1, C2, C3, and C4 at four points on lateral sides (near windows) of its body. Cameras C1 to C4 (an example of the imaging device) transmit to server 10 live videos of the views from the airplane PL synchronously captured during a flight. Cameras C1, C2, C3, and C4 have fields of view A1, A2, A3, and A4, respectively as shown in FIG. 1. Therefore, cameras C1 and C2 have an overlapping imaging range, whereas cameras C3 and C4 have an overlapping imaging range. The imaging ranges of cameras C1 and C2 do not overlap with those of cameras C3 and C4. The fields of view A1 to A4 may be all identical, or some or all of them may be different.

Figure 2:
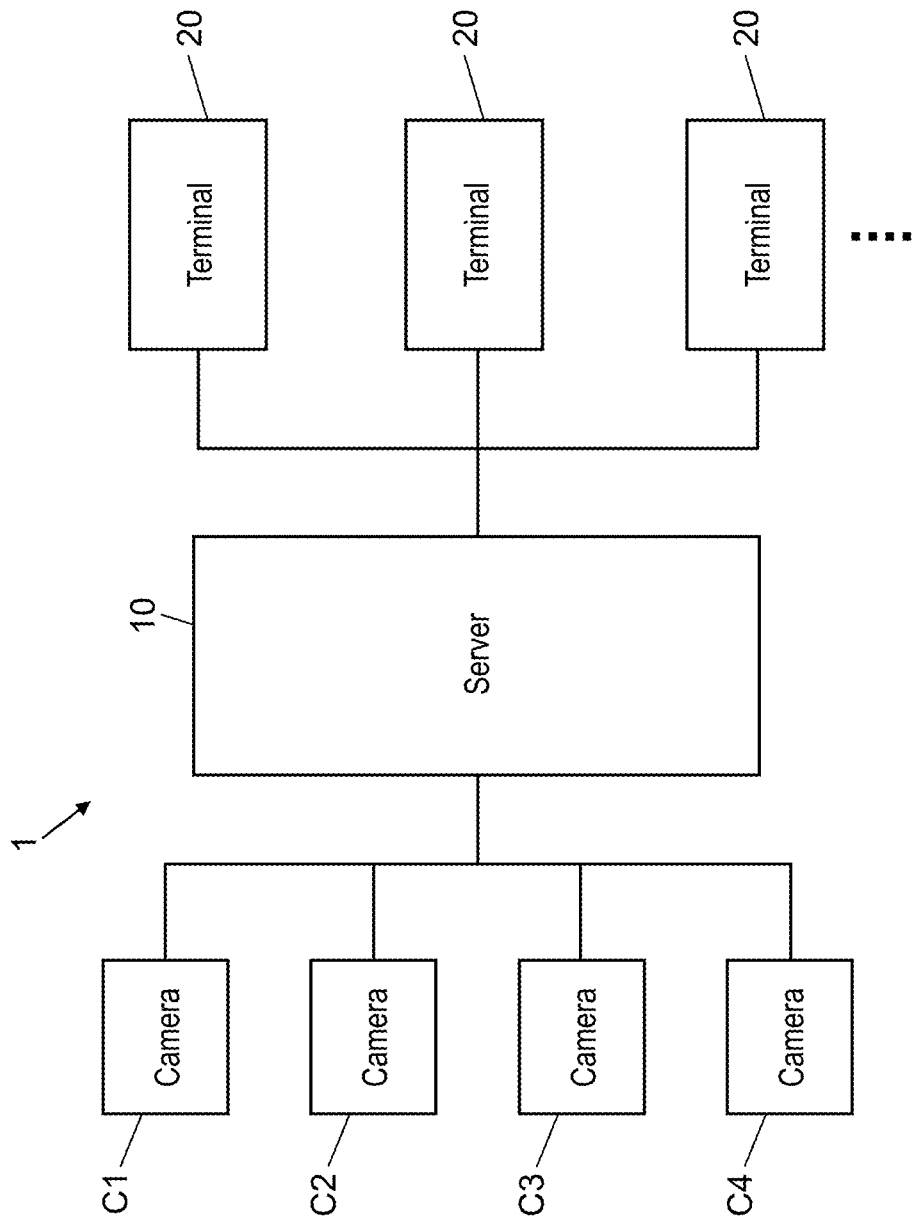
FIG. 2 is a schematic overall view of an image processing system in accordance with the first exemplary embodiment.

FIG. 2 is a schematic overall view of image processing system 1 in accordance with the present exemplary embodiment. System 1 includes server 10 and portable terminals 20, which are client terminals connectable to server 10. Thus, system 1 is a client-server system.

Server 10 acquires images that have been captured synchronously by cameras C1 to C4 and applies image processing to the acquired images as will be described in detail later.

Portable terminal 20 accesses server 10 to acquire an image that has been image processed by server 10, and displays the acquired image. The image (live video) displayed on terminal 20 is an omnidirectional (all-round) image. When the user points terminal 20 in a desired direction, terminal 20 displays the image corresponding to the direction.

1-1-2. Structure of the Server

Figure 3:
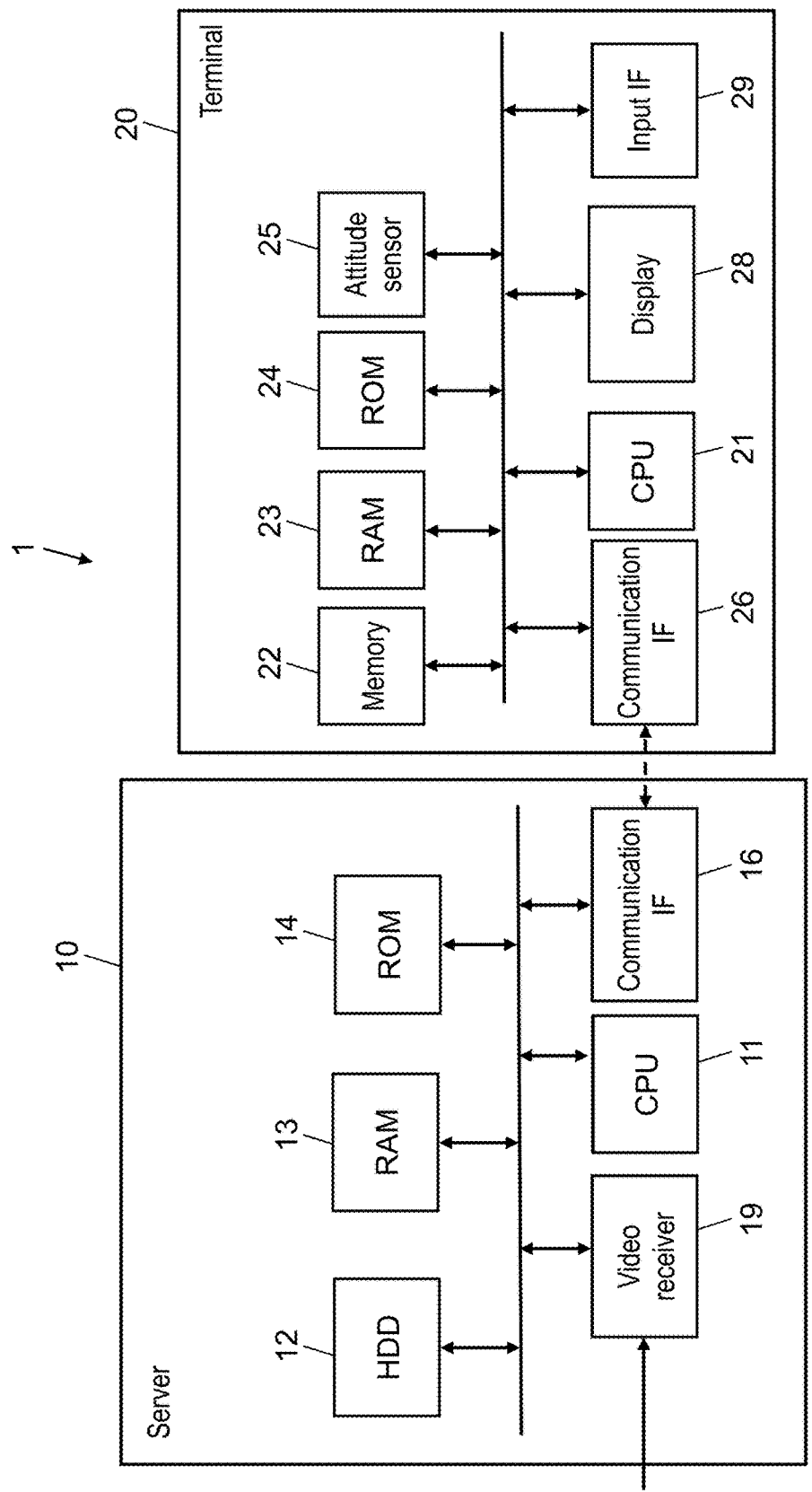
FIG. 3 is a schematic configuration view of a server and a portable terminal contained in the image processing system.

FIG. 3 is a schematic configuration view of server 10 and portable terminal 20.

Server 10 is a computer device to be installed in the airplane PL. Server 10 (an example of the image processing device) includes central processing unit (CPU) 11 (an example of the controller), hard disk drive (HDD) 12 (an example of the memory), random access memory (RAM) 13, read only memory (ROM) 14, communication interface (IF) 16, and video receiver 19.

CPU 11 is a processor or circuit that performs a process according to a predetermined program. HDD 12 stores programs and data such as applications and OS. HDD 12 may be connected as a separate storage device to server 10. RAM 13 temporarily stores, as a working memory, control programs and data. ROM 14 stores control programs which include the procedure of CPU 11. Communication IF 16 communicates with portable terminal 20 through wireless communication. Communication IF 16 includes, for example, a wireless communication circuit and a connector according to Wi-Fi or Bluetooth standard (registered trademark). Video receiver 19 includes a circuit and a connector that receive videos captured by cameras C1 to C4.

Figure 4:
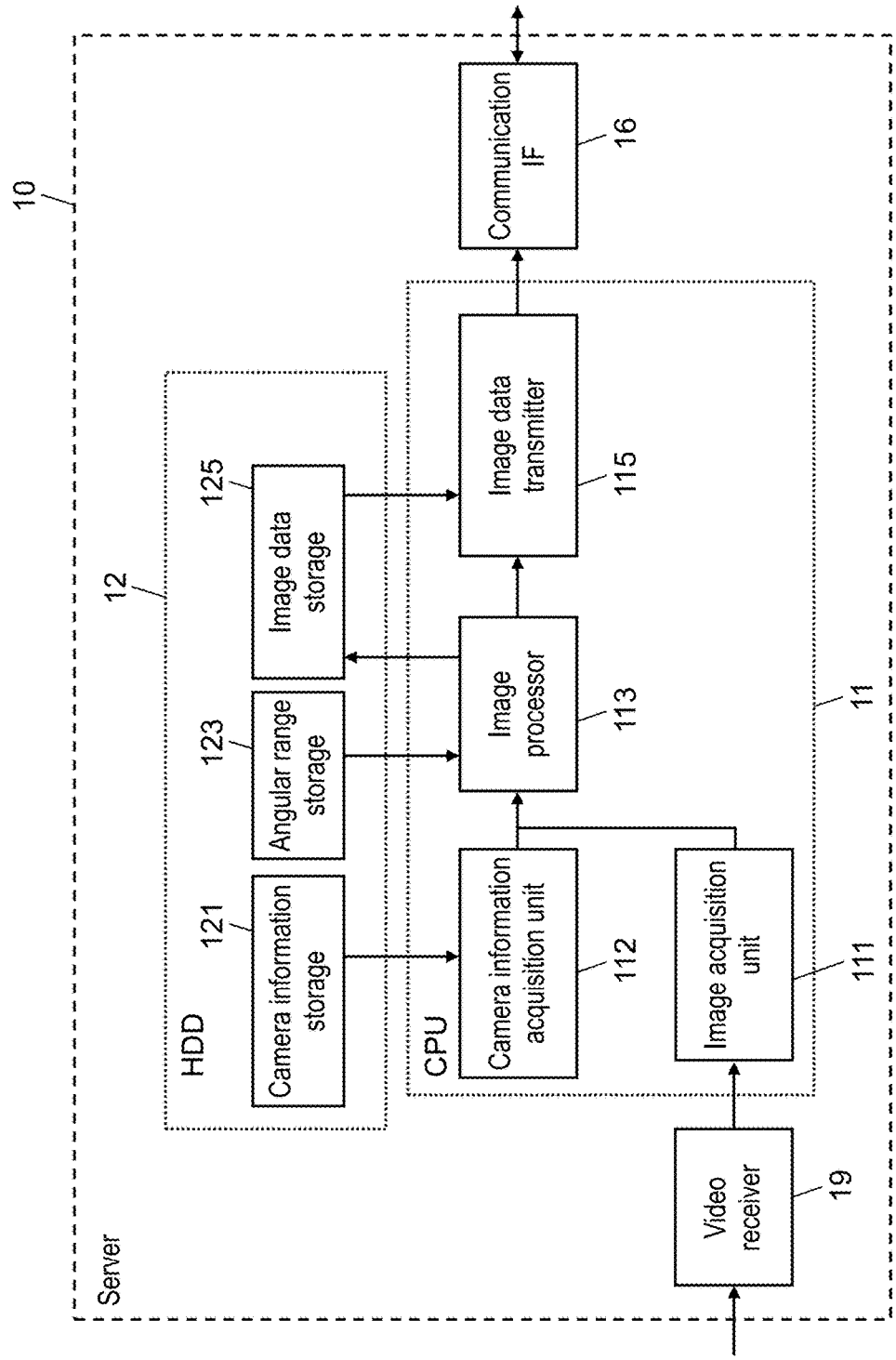
FIG. 4 is a functional view of the server.

FIG. 4 is a schematic functional view of server 10. Server 10 is an image processing device operated when CPU 11 reads a predetermined program and performs a process. CPU 11 includes image acquisition unit 111, camera information acquisition unit 112, image processor 113, and image data transmitter 115. Server 10 further includes camera information storage 121, angular range storage 123, and image data storage 125, which are components of HDD 12.

Image acquisition unit 111 acquires images (live videos) received through video receiver 19 from cameras C1 to C4. Camera information acquisition unit 112 acquires camera information previously stored in camera information storage 121. The camera information contains information indicating the pointing directions and fields of view of cameras C1 to C4.

Image processor 113 acquires predetermined angular ranges previously stored in angular range storage 123, and applies predetermined image processing to images based on the angular ranges and the camera information as will be described later. The predetermined image processing includes the following: generating first image data D1 by applying a stitching process to images captured by cameras C1 and C2; generating second image data D2 by applying a stitching process to images captured by cameras C3 and C4; and applying an angular-range change process to the first image data D1 and the second image data D2 as will be described later. This predetermined image processing generates omnidirectional image data that covers all directions, and the omnidirectional image data is stored in image data storage 125 and also transmitted to image data transmitter 115.

Image data transmitter 115 compresses the omnidirectional image data and transmits the compressed data to portable terminal 20 through communication IF 16 upon request from terminal 20. When server 10 transmits substantially real-time omnidirectional image data to terminal 20, image data transmitter 115 transmits to terminal 20 the omnidirectional image data directly received from image processor 113. Meanwhile, when server 10 transmits omnidirectional image data already stored in image data storage 125 to terminal 20, image data transmitter 115 acquires the omnidirectional image data from image data storage 125 and transmits it to terminal 20. The image data to be transmitted can be, for example, full hi-vision data.

1-1-3 Structure of the Portable Terminals

Portable terminal 20 can be a mobile phone, a smart phone, a tablet terminal, or other similar computer device carried by the user who is the passenger in the airplane PL. As shown in FIG. 3, portable terminal 20 (an example of the image display device) includes CPU 21 (an example of the controller), memory 22, RAM 23, ROM 24, attitude sensor 25, communication interface (IF) 26, display 28 (an example of the display unit), and input interface (IF) 29 (an example of the input unit).

CPU 21 is a processor or circuit that processes and outputs commands or data. Memory 22, which is a storage circuit such as a semiconductor memory, stores images and other data. RAM 23 temporarily stores, as a working memory, control program and data. ROM 24 stores control programs which include the procedure of CPU 21. Attitude sensor 25, which is a combination of any or all of a gyro sensor, an acceleration sensor, and an angular acceleration sensor, detects attitude information such as the direction and inclination of portable terminal 20.

Communication IF 26 includes a wireless communication circuit and a connector according to Wi-Fi or Bluetooth standard (registered trademark), and communicates with server 10 via an antenna (not shown) through wireless communication. Display 28, which can be a liquid crystal panel, an organic EL panel, or other similar panel, includes a screen to display processed images. Input IF 29 receives an input operation of the user via a touch panel, a keyboard, or a pointing device (e.g., mouse).

Figure 5:
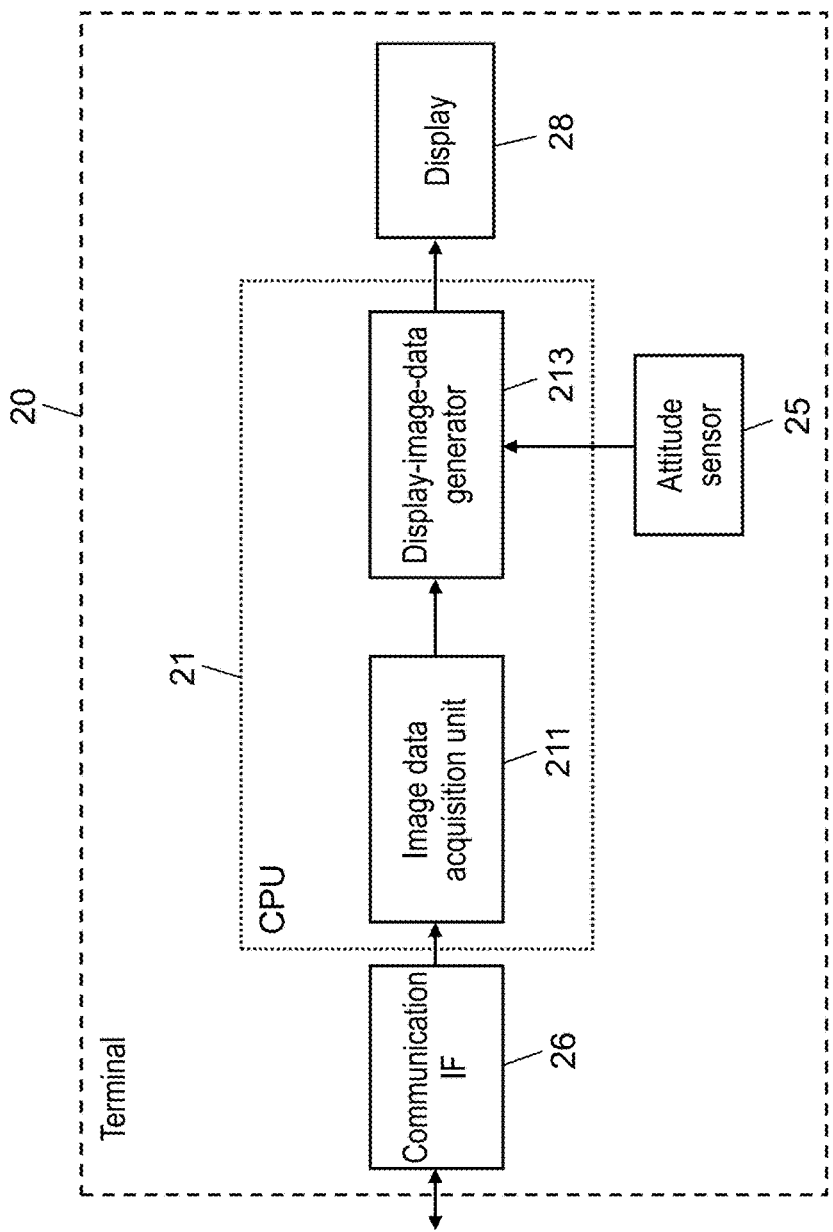
FIG. 5 is a functional view of the portable terminal.

FIG. 5 is a schematic functional view of portable terminal 20. Terminal 20 is an image display device operated when CPU 21 reads a predetermined program and performs a process. CPU 21 includes image data acquisition unit 211 and display-image-data generator 213.

Image data acquisition unit 211 acquires omnidirectional image data from server 10 through communication IF 26. Display-image-data generator 213 acquires attitude information such as the direction and inclination of portable terminal 20 from attitude sensor 25. Display-image-data generator 213 then generates an image corresponding to the acquired attitude information based on a 3D model as will be described later, and makes display 28 display the generated image.

1-2. Operation 1-2-1. Operation of the Server

Figure 6A:
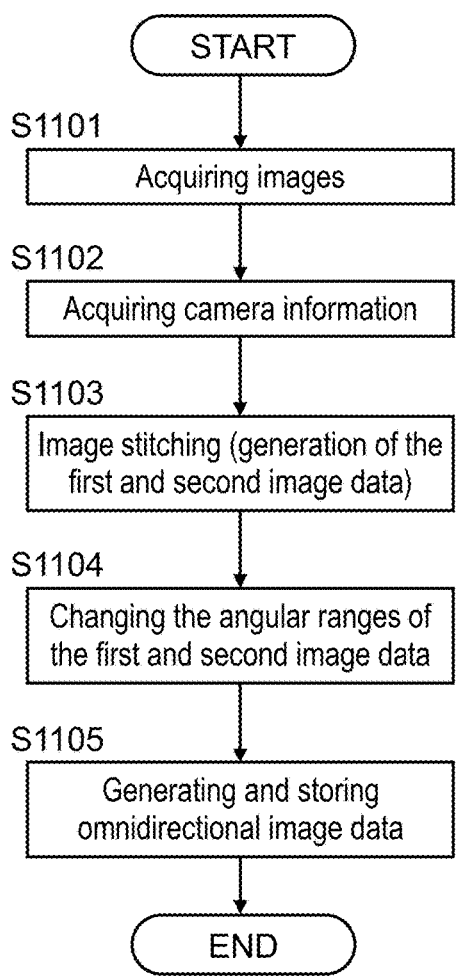
FIG. 6A is a flowchart of an image processing performed by the server.

FIG. 6A is a flowchart of an image processing method performed by the image processing device, which is mainly composed of CPU 11 of server 10.

In Step S1101, image acquisition unit 111 of server 10 acquires images (live videos) captured by cameras C1 to C4.

In Step S1102, camera information acquisition unit 112 acquires camera information containing information about the pointing directions and fields of view of cameras C1 to C4. Camera information acquisition unit 112 acquires the camera information from camera information storage 121, but may alternatively acquire it from cameras C1 to C4.

In Step S1103, image processor 113 combines the images of cameras C1 and C2 through a stitching process to generate the first image data D1. Image processor 113 further combines the images of cameras C3 and C4 through a stitching process to generate the second image data D2.

Figure 8:
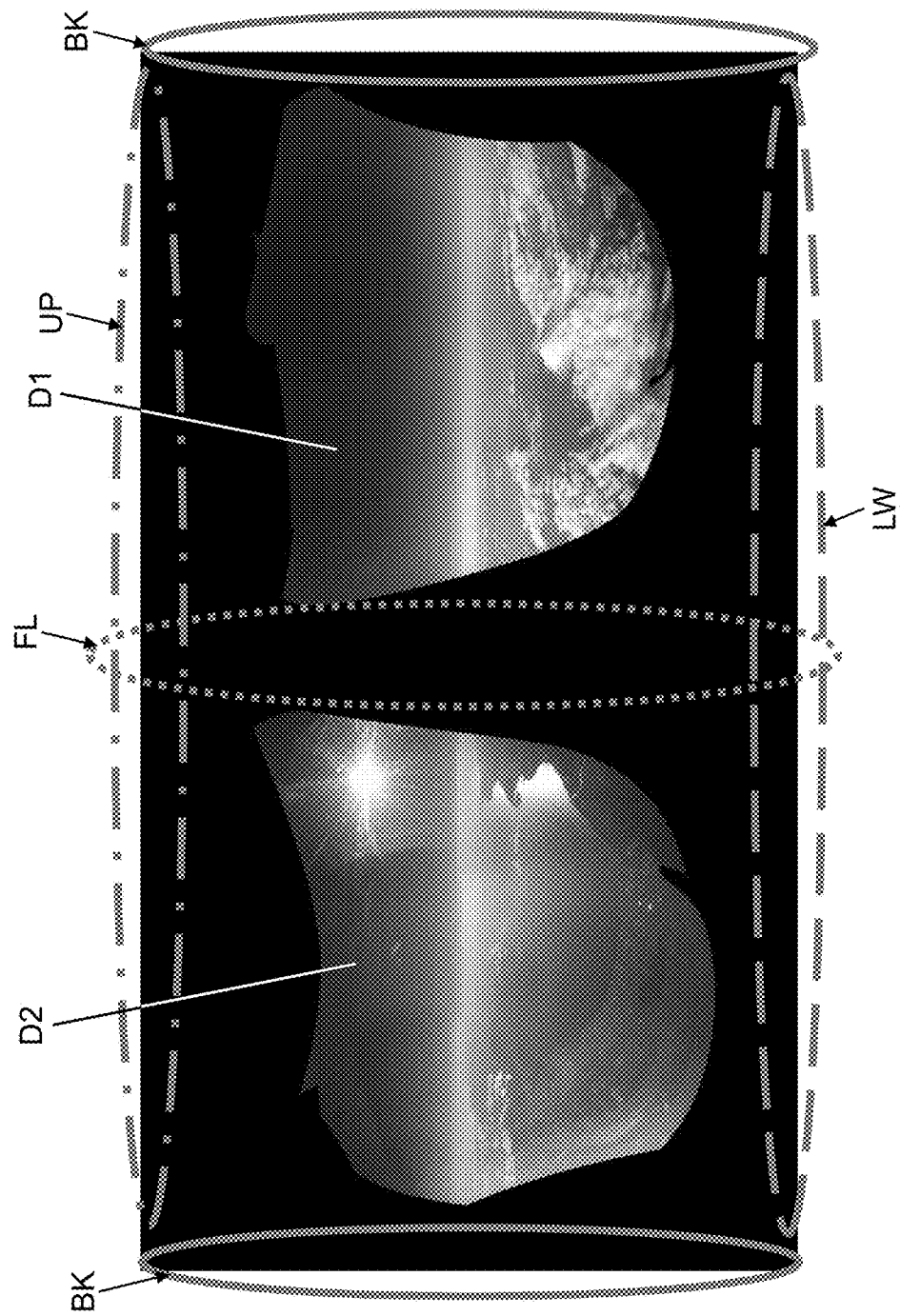
FIG. 8 shows an example of images acquired by cameras.

The term "stitching process" means a process of combining a plurality of images together. In the present exemplary embodiment, cameras C1 and C2 located on a lateral side of the airplane PL capture views in the same direction as shown in FIG. 1. Therefore, as shown in FIG. 8, these two images can be pasted together to generate the first image data D1, which is a single contiguous image. Similarly, cameras C3 and C4 located on the other lateral side of the airplane PL capture views in the same direction. Therefore, these two images can be pasted together to generate the second image data D2, which is a single contiguous image.

In Step S1104, image processor 113 changes the angular ranges of the first image data D1 and the second image data D2. The angular ranges are previously stored as predetermined angular ranges in angular range storage 123. The angular ranges are changed for the following reasons.

The images acquired from cameras C1 to C4 are lacking in data for the following areas: front FL, up UP, below LW, back BK of the airplane PL as shown in FIG. 8. In other words, there are some areas that cannot be covered by cameras C1 to C4. The image processing compensates at least part of the lacking areas using the first image data D1 and the second image data D2.

Figure 9B:
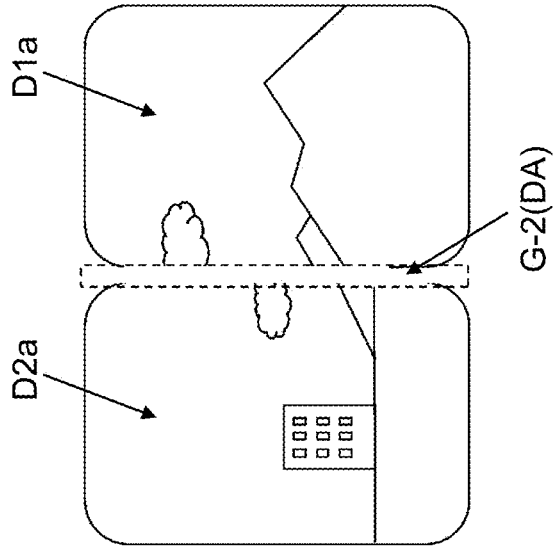
FIG. 9B shows other images illustrating the concept of the image processing.
Figure 9A:
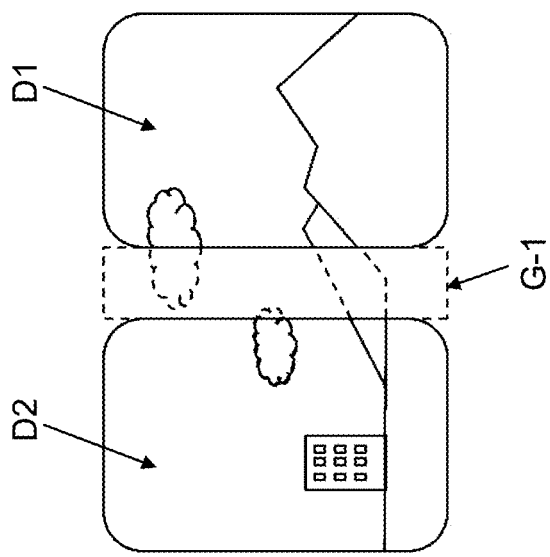
FIG. 9A shows images illustrating the concept of the image processing.

For example, as shown in FIG. 9A, between the first image data D1 and the second image data D2, there is a gap G-1 from which no image has been acquired. In this case, image processing zooms in the first image data D1 and the second image data D2 to make them closer to each other to generate first image data D1a and second image data D2a as shown in FIG. 9B. As a result of this image processing, a gap G-2 smaller than the gap G-1 is formed between the first image data D1a and the second image data D2a. The gap G-2 is small enough for the first image data D1a and the second image data D2a to be perceived by the human eye as if the data D1a and D2a were contiguous due to visual completion. Thus, image processing is performed to form the gap G-2, which is visible when displayed.

In an image to be displayed, the gap G-2 has an image data area (blank area DA), which is not contained in either the first image data D1a or the second image data D2a as shown in FIG. 9B. The blank area DA may be filled with one-color data like black or gray or may be assigned predetermined image data previously stored in the memory or other recording media (see FIG. 11).

Changing the angular ranges includes performing image processing to make the first image data D1 and the second image data D2 have angular ranges either larger or smaller in at least one direction than the fields of view contained in the camera information. This results in the generation of image data that has been zoomed in or out from the original images acquired from cameras C1 to C4. Generating the image data that has been zoomed in or out from the original images includes the following processes.

Figure 10:
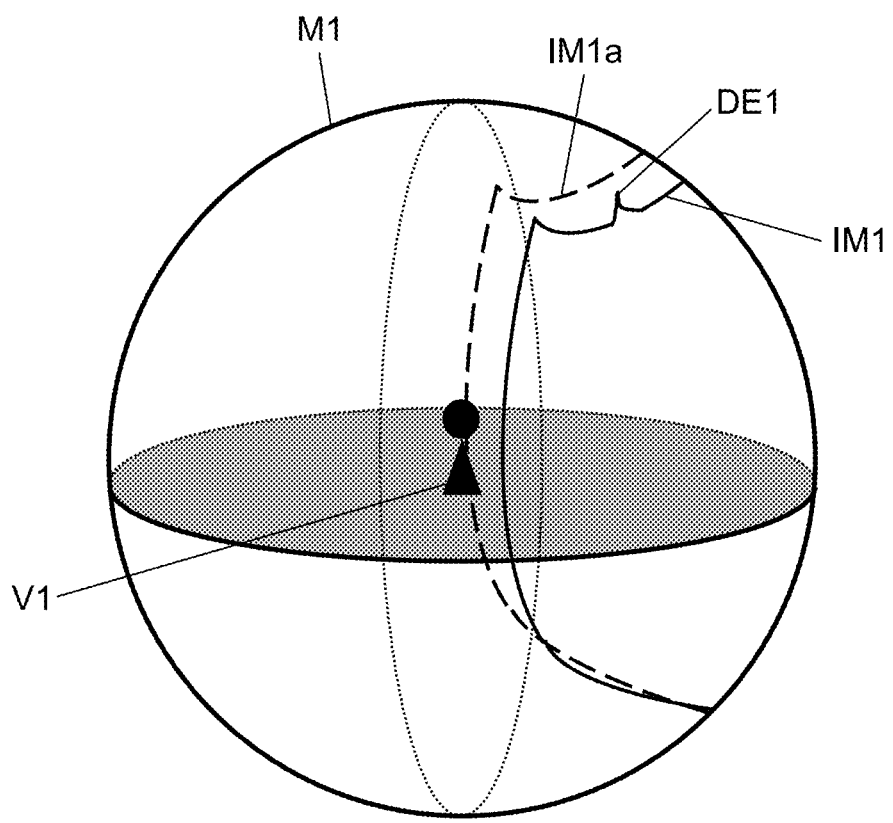
FIG. 10 is a diagram showing the formation of a 3D model to display an omnidirectional image.

FIG. 10 is a conceptual diagram, as will be described later, of a 3D model M1 of the omnidirectional image data generated by portable terminal 20. FIG. 10 shows a comparison between two types of image data pasted onto the 3D model: original image data IM1 (shown in the solid line) corresponding to the fields of view of the cameras and processed image data IM1a (shown in the broken line) to change the angular ranges of the data IM1. As shown in FIG. 10, the angular ranges of the original image data IM1 are increased at least in one direction to acquire the processed image data IM1a that has been zoomed in at least in the one direction. In addition, the angular ranges of the original image data IM1 are reduced in a different direction to acquire processed image data IM1a that has been zoom out in the different direction.

Increasing the angular ranges compensates part of the area whose image has not been acquired of the omnidirectional image data and generates a more natural all-round image. If the joint part of a stitching-processed image is deformed, the deformed part (e.g., a deformed part DE1 of FIG. 10) can be reduced by decreasing the angular ranges.

The direction to change the angular ranges and whether the angular ranges are increased or decreased in that direction are previously determined and stored as the predetermined angular ranges in angular range storage 123.

Figure 11:
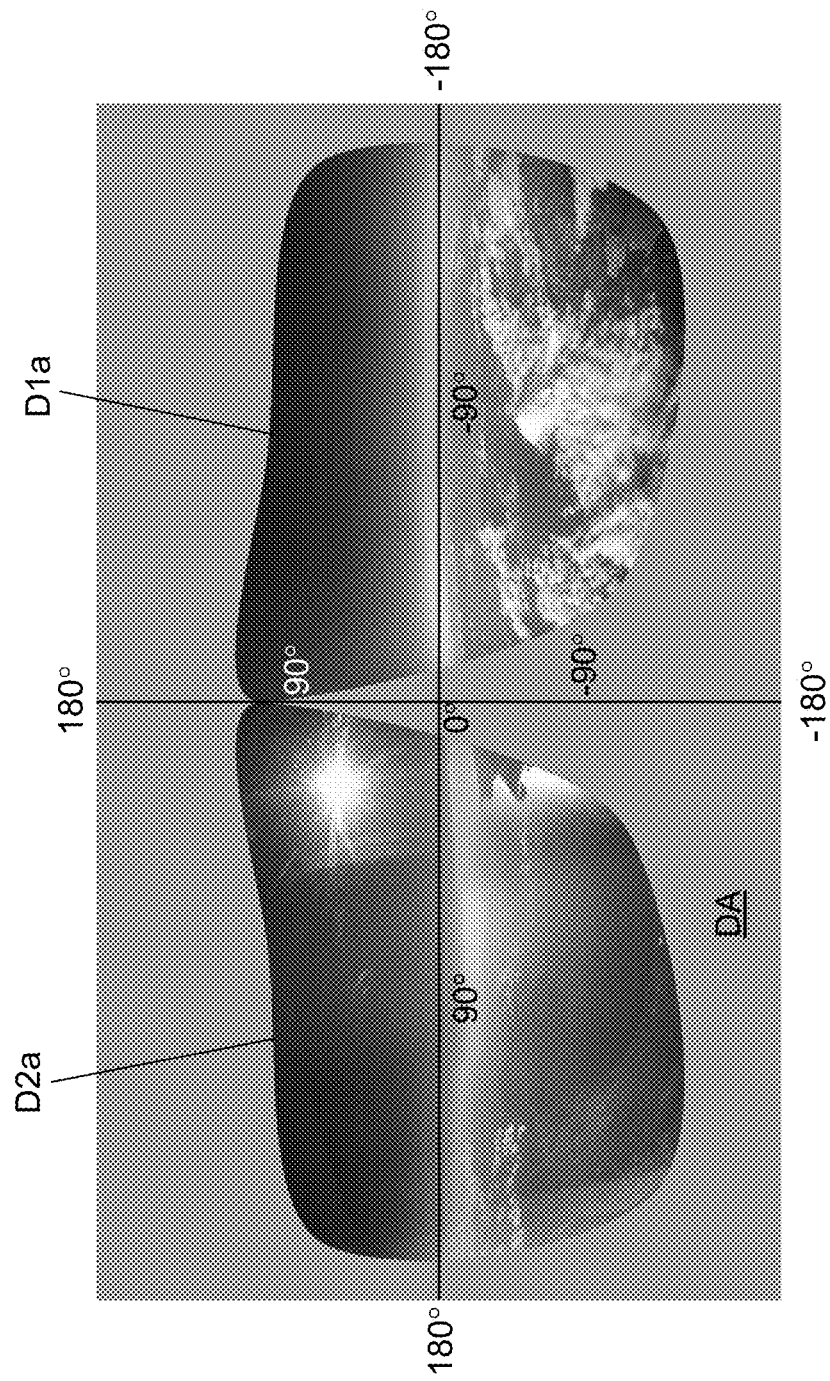
FIG. 11 shows image data processed by the server.

As a result of the above-described process, the first image data D1 and the second image data D2 (the state of FIG. 8) are changed into the first image data D1$a$ and the second image data D2$a$, respectively (the state of FIG. 11). This results in a change in the angular ranges corresponding to the fields of view at the time of the image data D1 and D2 being captured.

In Step S1105, the first image data D1$a$ and the second image data D2$a$ whose angular ranges have been changed are transmitted as a single piece of omnidirectional image data to image data transmitter 115 and are also stored in image data storage 125 to be sequentially updated.

Figure 6B:
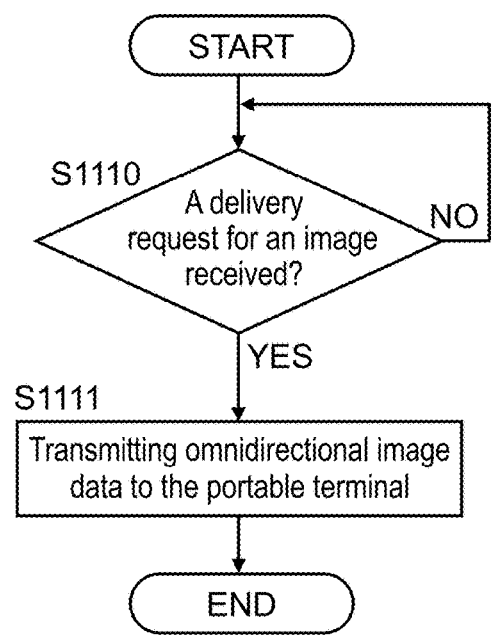
FIG. 6B is a flowchart of another image processing performed by the server.

As shown in FIG. 6B, upon receiving a request from portable terminal 20, which is a client (Step S1110), server 10 transmits omnidirectional image data to terminal 20 (Step S1111).

1-2-2. Operation of the Portable Terminal

Figure 7:
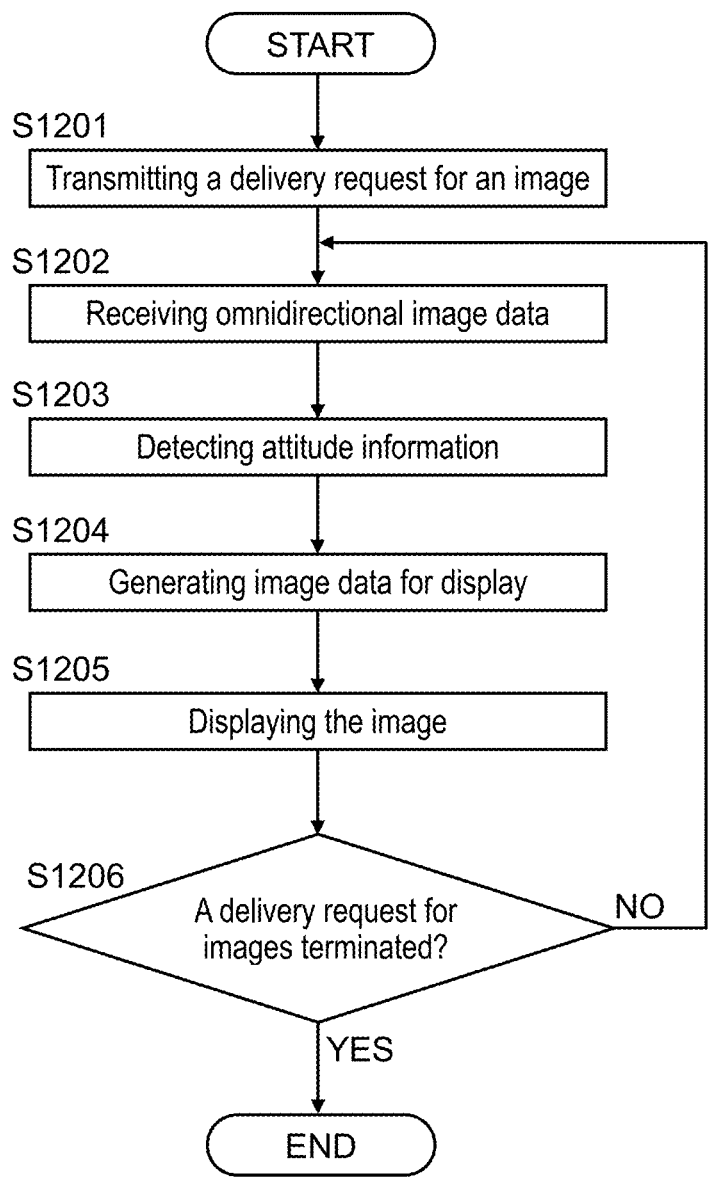
FIG. 7 is a flowchart of an image display processing performed by the portable terminal.

FIG. 7 is a flowchart showing the image display method performed by the image display device mainly composed of CPU 21 of portable terminal 20.

In Step S1201, after establishing a connection with server 10, portable terminal 20 transmits a delivery request for an image to server 10.

In Step S1202, image data acquisition unit 211 receives a stream of omnidirectional image data generated by server 10. The omnidirectional image data is stored in memory such as a buffer and updated every time new data is received.

In Step S1203, display-image-data generator 213 detects attitude information containing the inclination and direction of portable terminal 20 through attitude sensor 25.

In Step S1204, display-image-data generator 213 generates an image in a predetermined direction and range from the received omnidirectional image data in accordance with the detected attitude information of portable terminal 20.

As conceptually shown in FIG. 10, an image is generated using a 3D model whose center is at the location of portable terminal 20 (at the location of the user of terminal 20, which corresponds to a viewpoint V1 shown in FIG. 10). Such a 3D model can be generated by, for example, a well-known texture mapping technique. The texture mapping is a graphics processing in which a texture image is pasted onto a three-dimensional surface. The 3D model assigns the omnidirectional image data along the periphery of the viewpoint V1 so as to display the omnidirectional image corresponding to the position of portable terminal 20. The 3D model is updated in accordance with the frame rate of server 10.

The viewpoint V1 corresponding to the position of portable terminal 20 is at a previously determined position because cameras C1 to C4 are fixed to the airplane PL, and the position of terminal 20 (i.e., the position of the user) is inside the airplane PL.

As described above, image data for display is generated in accordance with the position of portable terminal 20 (corresponding to the viewpoint V1 and fixed to the center of the sphere, which is the 3D model), and the detected attitude information of terminal 20.

In Step S1205, the image data for display generated in Step S1204 is displayed. More specifically, the image corresponding to the direction and inclination of portable terminal 20 held by the user is shown on the screen of display 28. The image data for display is updated and displayed every time new attitude information is detected.

In this case, image data for display containing an image data area (blank area DA), which is not contained in either the first image data D1 or the second image data D2 may be displayed depending on the direction in which the user holds terminal 20 (the front, back, up, or below of the airplane PL).

In Step S1206, the process goes back to Step S1202 to repeat the above-described steps until the delivery of images from server 10 is terminated. The termination of the delivery of images is performed, for example, when the user makes a request to stop displaying images on portable terminal 20, or when server 10 suspends the delivery of images.

1-3. Characteristics

Server 10 (an example of the image processing device) in accordance with the present exemplary embodiment is an image processing device for generating a single image based on a plurality of images captured by a plurality of cameras C1 to C4 (an example of the imaging device) facing different directions from each other. Server 10 includes HDD 12 (an example of the memory) and CPU 11 (an example of the controller). HDD 12 stores information at least containing the pointing directions and fields of view of cameras C1 to C4. CPU 11 operates as follows: to generate, from a plurality of images, the first image data D1 and the second image data D2 whose imaging ranges do not overlap; to apply image processing to the data D1 and D2 in such a manner that the data D1 and D2 have angular ranges larger than the fields of view in at least one direction; and to generate a single piece of omnidirectional image data (an example of the multidirectional image data) containing the first image data D1$a$ and the second image data D2$a$, which have been obtained by image-processing.

Therefore, even if there are areas with no captured images between a plurality of images captured by a plurality of cameras C1 to C4, the ranges of these areas can be reduced by increasing the angular ranges of the images from the cameras. This results in the generation of more natural image data for display.

Furthermore, CPU 11 generates the omnidirectional image data containing a predetermined image data area (blank area DA) that is located between the first image data D1$a$ and the second image data D2$a$ and is not contained in either of the data D1$a$ and D2$a$. The blank area DA (the area with no images captured by cameras C1 to C4) is perceived by the human eye as if the image was contiguous due to visual completion. The blank area DA also prevents distortion or deviation of images that might otherwise occur when discontiguous images are directly combined together. As a result, a more natural image can be achieved.

Portable terminal 20 (an example of the image display device) in accordance with the present exemplary embodiment is an image display device for displaying a single image generated based on a plurality of images captured by a plurality of cameras C1 to C4 (an example of the imaging device) facing different directions from each other. Terminal 20 includes CPU 21 (an example of the controller) and display 28 (an example of the display unit). CPU 21 acquires omnidirectional image data generated based on a plurality of images, and generates image data for display, from the omnidirectional image data, in accordance with the attitude of terminal 20. Display 28 displays the image data for display. The omnidirectional image data contains at least two pieces of image data whose imaging ranges do not overlap, and also contains a predetermined image data area (blank area DA) that is located between two pieces of image data and is not contained in either of the two pieces of image data. Display 28 is capable of displaying the blank area DA contained in the image data for display. The blank area DA may be visibly displayed when the image data for display is displayed.

Therefore, of the omnidirectional image data generated from a plurality of images captured by cameras C1 to C4, the area (blank area DA) with no captured images is perceived by the human eye as if the first image data D1a and the second image data D2a were contiguous due to visual completion. The blank area DA also prevents distortion or deviation of images that might otherwise occur when discontinuous images are combined together. As a result, a more natural image can be displayed.

Other Exemplary Embodiments

The first exemplary embodiment has been described as a technical example of the present application, but the technique of the present disclosure is not limited to it and is applicable to other exemplary embodiments provided with modifications, replacements, additions, omissions, etc.

[1] In the above-described first exemplary embodiment, image processor 113 (FIG. 4) of server 10 generates omnidirectional image data containing a predetermined image data area (blank area DA) that is located between the first image data D1a and the second image data D2a and is not contained in either of the data D1a and D2a (Steps S1104 to S1105 in FIG. 6A). However, this is not the only option available. Alternatively, image processor 113 may generate omnidirectional image data containing the first image data D1a and the second image data D2a contiguous to each other without the blank area DA disposed between them. Even this can display the image less unnaturally than in the case in which the first image data D1 and the second image data D2 are merely combined together without changing their angular ranges.

[2] In the above first exemplary embodiment, the number and pointing directions of the cameras are not limited to those described above. For example, two cameras C1 and C2 may be replaced by a single camera, or two cameras C3 and C4 may be replaced by a single camera. In these cases, the stitching process is unnecessary in the image processing device (server 10). Alternatively, two cameras C1 and C2 may be replaced by three or more cameras, or two cameras C3 and C4 may be replaced by three or more cameras. In these cases, the image processing device (server 10) combines three or more images together in a stitching process.

The installation positions of the cameras are not limited; they may be in the upper or lower part of the body of the airplane PL.

Figure 12:
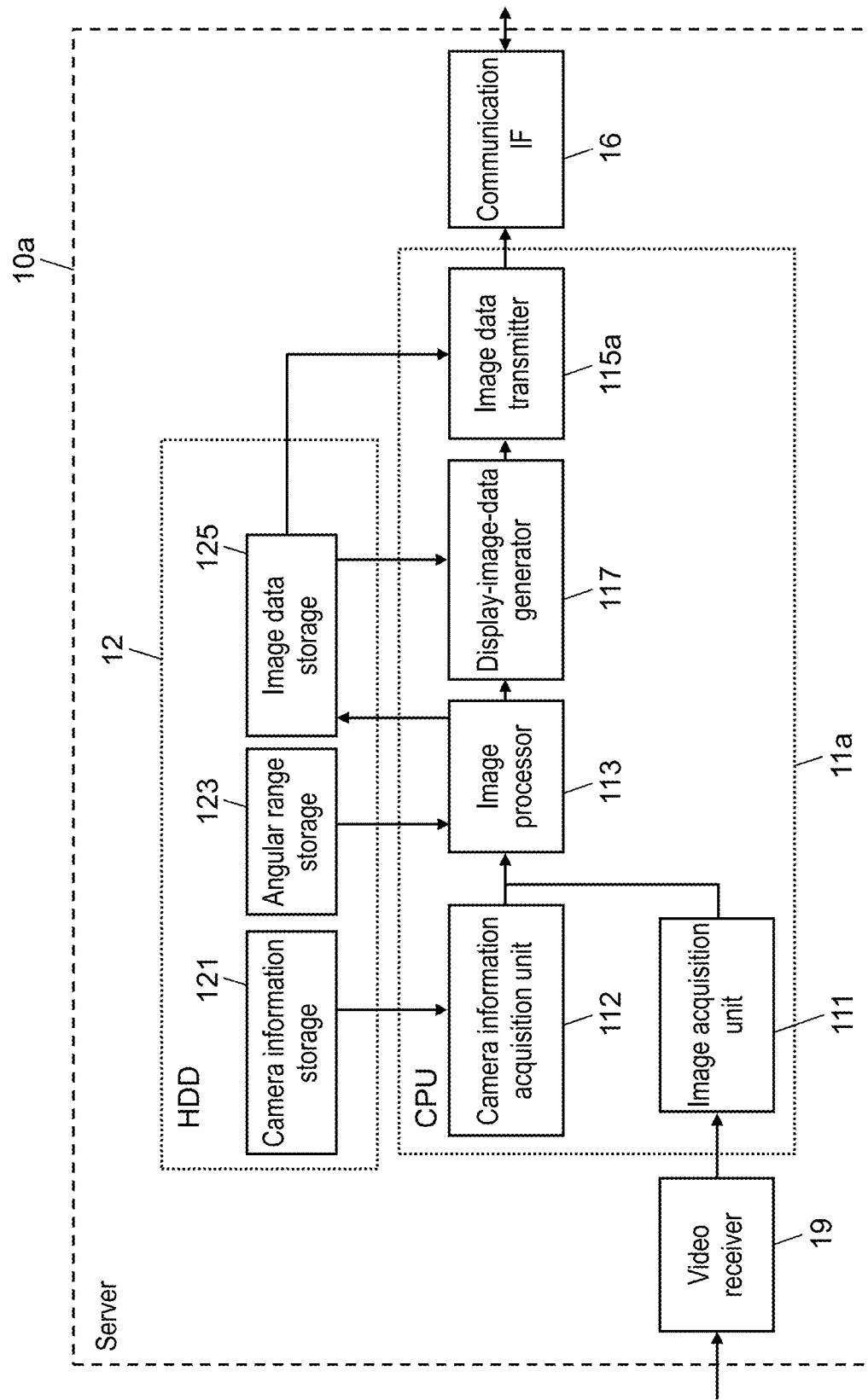
FIG. 12 is a functional view of a server in accordance with another embodiment.

[3] In the first exemplary embodiment, portable terminal 20 generates image data for display, and then generates an image to be displayed in accordance with attitude information; alternatively, however, server 10a may have these functions. In the latter case, as shown in FIG. 12, server 10a includes CPU 11a including display-image-data generator 117, which corresponds to display-image-data generator 213 of portable terminal 20 and image data transmitter 115a, which sends out image data for display. Thus, the omnidirectional image data generated through image processing by image processor 113 is transmitted to display-image-data generator 117 and is also stored in image data storage 125. When server 10a transmits substantially real-time omnidirectional image data to portable terminal 20, image data for display is generated by display-image-data generator 117 from the omnidirectional image data that has been directly transmitted to display-image-data generator 117 from image processor 113. Meanwhile, when server 10a transmits the omnidirectional image data stored in image data storage 125 to terminal 20, the omnidirectional image data stored in image data storage 125 is read out by display-image-data generator 117 to generate image data for display. The other structures and functions are identical to those shown in FIG. 4.

In the same manner as display-image-data generator 213 of portable terminal 20 shown in FIG. 5, display-image-data generator 117 generates, using a 3D model, image data for display in accordance with the attitude information (information detected by attitude sensor 25 shown in FIG. 5) received from terminal 20. Display-image-data generator 117 then transmits the generated image data for display to image data transmitter 115a. Image data transmitter 115a transmits the image data for display to terminal 20 through communication IF 16. Terminal 20 makes display 28 display the received image data for display. When terminal 20 generates image data for display, the omnidirectional image data stored in image data storage 125 is transmitted to terminal 20 through image data transmitter 115a and communication IF 16 in the same manner as in the first exemplary embodiment.

[4] The image display device used in the first exemplary embodiment is portable terminal 20, but may alternatively be a terminal device fixed to, for example, a seat. The terminal device has the same configuration as portable terminal 20 shown in FIG. 3 except that it does not include an attitude sensor. Image data for display in a desired direction is generated from the omnidirectional image data in accordance with an input operation through an input interface (IF) such as a touch panel or an operation button and is displayed.

[5] In the first exemplary embodiment, omnidirectional image data is generated; alternatively, however, semi-omnidirectional image data may be generated. In this case, image processing similar to that shown in FIG. 6A is performed using either the images captured by cameras C1 and C2 or the images captured by cameras C3 and C4 shown in FIG. 1. The image processing device applies an angular-range change process to either the first image data D1 or the second image data D2 within the imaging ranges on one side of the airplane PL to generate semi-omnidirectional image data, and transmits the generated data to the image display device.

Alternatively, it is possible to generate a cylindrical image or other multi-directional panoramic image (a partial image of the omnidirectional image with an angular range of, for example, less than 180 degrees, or 180 degrees or more and less than 360 degrees, exclusive).

[6] In the first exemplary embodiment, the angular ranges of the first image data D1 and the second image data D2 to be changed are not limited to those previously stored and may automatically be calculated from the camera information by CPU 11 of server 10 using a predetermined calculation formula or correspondence table.

[7] The cameras are installed in an airplane in the first exemplary embodiment, but may alternatively be installed in other vehicles such as automobiles, trains, and ships. Alternatively, the image processing system of the present disclosure may be applied to a system like a surveillance camera installed in a fixed location such as buildings and other facilities.

[8] Server 10 or portable terminal 20 may detect the position information of terminal 20 using, for example, a GPS sensor and display an image in accordance with the position information. For example, it is possible to form and store a plurality of 3D models with different center positions from each other (different in the viewpoint V1 shown in FIG. 10), to select a 3D model in accordance with the position information acquired from the GPS sensor (not shown) of portable terminal 20, to generate a corresponding image, and to display it on display 28.

In this case, it is possible to detect the position information of the airplane PL or server 10 instead of the position information of portable terminal 20, to select a 3D model in accordance with the position information, to generate a corresponding image, and to display it on display 28.

It is also possible for server 10 or portable terminal 20 to acquire flight information of the airplane PL and to display multi-directional image in accordance with the flight information. For example, it is possible to associate the 3D model image with the flight information (including the time and distance after takeoff) of the airplane at the time of capturing images and to store the image in the memory, so that the image in accordance with the current flight information can be displayed.

[9] In the first exemplary embodiment, the storage of the image processing device such as server 10 is not limited to HDD 12, and may alternatively be a semiconductor memory, an optical storage medium, a magneto-optical storage medium, etc.

The image display device such as portable terminal 20 may include, in addition to CPU 21, a processor or a circuit such as a graphics processing unit (GPU) or a visual processing unit (VPU), which mainly performs image processing. Furthermore, RAM 23 may include a VRAM for temporarily storing image data to be displayed on the screen of display 28.

[10] The order of performing the processes (FIGS. 6A, 6B, 7) in the first exemplary embodiment may be changed within the scope of the present invention. For example, Step S1103 and Step S1104 in FIG. 6A may be performed in reverse order.

[11] The present disclosure is not limited to embodiments performed by an image processing device or an image display device. The present disclosure includes an image processing method performed by the image processing device, an image display method performed by the image display device, a computer program executed by the image processing device or the image display device, and a computer-readable recording medium in which the program is stored. Examples of the computer-readable recording medium include flexible disks, hard disks, CD-ROMs, MOs, DVDs, DVD-ROMs, DVD-RAMs, Blu-ray (registered trademark) Discs (BDs), and semiconductor memories.

The above-mentioned computer program is not limited to that stored in the recording medium, and may alternatively be a program that is transmitted through an electrical communication line, a wireless or wired communication line, or a network such as the Internet.

INDUSTRIAL APPLICABILITY

The present disclosure can be used as an image processing device, an image display device, an image processing system, and an image processing method.

What is claimed is:

1. An image processing device for generating a single image based on a plurality of images captured by a plurality of imaging devices having different pointing directions from each other, the image processing device comprising:
 a memory configured to store information containing at least the pointing directions and fields of view of the plurality of imaging devices; and
 a controller configured to operate as follows: to acquire or generate, from the plurality of images, first image data and second image data whose imaging ranges do not overlap, to apply image processing to the first image data and the second image data in such a manner that the first image data and the second image data have angular ranges larger than the fields of view in at least one direction, and to generate a single piece of multi-orientation image data containing the image-processed first image data and second image data.

2. The image processing device according to claim 1, wherein the controller generates the multi-orientation image data in such a manner that the multi-orientation image data contains a predetermined image data area between the first image data and the second image data, the predetermined image data area being not contained in either of the first image data and the second image data.

3. The image processing device according to claim 2, wherein the controller generates the multi-orientation image data in such a manner that the predetermined image data area is visible when the multi-orientation image data is displayed.

4. The image processing device according to claim 1, wherein the controller applies the image processing to the first image data and the second image data in such a manner that the first image data and the second image data have angular ranges smaller than the fields of view in a direction different from the at least one direction.

5. The image processing device according to claim 1, wherein the controller generates at least one of the first image data and the second image data by connecting a plurality of images whose imaging ranges overlap.

6. The image processing device according to claim 1, wherein the multi-orientation image data comprises one of omnidirectional image data, semi-omnidirectional image data, and part of the omnidirectional image data.

7. An image processing system comprising:
 the image processing device according to claim 1; and
 an image display device communicative with the image processing device and including a display unit capable of displaying at least part of the single piece of multi-orientation image data.

8. An image display device for displaying a single image generated based on a plurality of images captured by a plurality of imaging devices having pointing directions different from each other and having predetermined fields of view, the image display device comprising:
 a controller configured to acquire multi-orientation image data generated based on the plurality of images and to generate image data for display from the multi-orientation image data in accordance with an attitude or an operation of the image display device, the multi-orientation image data containing at least two pieces of image data whose imaging ranges do not overlap; and
 a display unit configured to display the image data for display, the display unit being able to display the predetermined image data area contained in the image data for display, wherein
 the controller processes data of at least one of the plurality of images in such a manner that the data of the at least one of the plurality of images have angular ranges larger than the fields of view in at least one direction.

9. The image display device according to claim 8, wherein the display unit visibly displays the predetermined image data area.

10. The image display device according to claim 8, further comprising an attitude sensor configured to detect the attitude of the image display device,
 wherein the display unit displays image data for display generated in accordance with the attitude of the image display device.

11. The image display device according to claim 8, further comprising an input unit configured to receive an input operation,
 wherein the display unit displays image data for display generated in accordance with the input operation.

12. The image display device according to claim 8, wherein the multi-orientation image data comprises one of omnidirectional image data, semi-omnidirectional image data, and part of the omnidirectional image data.

13. An image processing method for generating a single image based on a plurality of images captured by a plurality of imaging devices having different pointing directions from each other, the image processing method comprising:
  storing information in a memory, the information containing at least the pointing directions and fields of view of the plurality of imaging devices;
  acquiring or generating, from the plurality of images, first image data and second image data whose imaging ranges do not overlap;
applying image processing to the first image data and the second image data in such a manner that the first image data and the second image data have angular ranges larger than the fields of view in at least one direction; and
  generating a single piece of multi-orientation image data containing the image-processed first image data and second image data.

14. An image display device for displaying a single image generated based on a plurality of images captured by a plurality of imaging devices having different pointing directions from each other, the image display device comprising;
  a controller configured to acquire multi-orientation image data generated based on the plurality of images and to generate image data for display from the multi-orientation image data in accordance with an attitude or an operation of the image display device, the multi-orientation image data containing at least two pieces of image data whose imaging ranges do not overlap and further containing a predetermined image data area between the two pieces of image data, the predetermined image data area being not contained in either of the two pieces of image data;
  a display unit configured to display the image data for display, the display unit being able to display the predetermined image data area contained in the image data for display; and
  an attitude sensor configured to detect the attitude of the image display device, wherein
  the display unit displays image data for display generated in accordance with the attitude of the image display device.

15. The image display device according to claim 14, wherein the display unit visibly displays the predetermined image data area.

16. The image display device according to claim 14, further comprising an input unit configured to receive an input operation,
  wherein the display unit displays image data for display generated in accordance with the input operation.

17. The image display device according to claim 14, wherein the multi-orientation image data comprises one of omnidirectional image data, semi-omnidirectional image data, and part of the omnidirectional image data.

18. An image processing device for generating a single image based on a plurality of images captured by a plurality of imaging devices having different pointing directions from each other, the image processing device comprising:
  a memory configured to store information containing at least the pointing directions and fields of view of the plurality of imaging devices; and
  a controller configured to operate as follows: to acquire or generate, from the plurality of images, first image data and second image data whose imaging ranges do not overlap, to apply image processing to at least one of the first image data and the second image data in such a manner that the at least one of the first image data and the second image data have angular ranges larger than the fields of view in at least one direction, and to generate a single piece of multi-orientation image data containing the image-processed first image data and second image data.

\* \* \* \* \*